United States Patent
Byun et al.

(10) Patent No.: US 12,415,526 B2
(45) Date of Patent: Sep. 16, 2025

(54) AUTONOMOUS DRIVING CONTROL APPARATUS AND METHOD THEREOF

(71) Applicants: HYUNDAI MOTOR COMPANY, Seoul (KR); KIA CORPORATION, Seoul (KR); HYUNDAI AUTOEVER CORP., Seoul (KR)

(72) Inventors: Je Hyung Byun, Yongin-si (KR); Seung Jun Oh, Seogwipo-si (KR); Bong Ju Kim, Yongin-si (KR)

(73) Assignees: HYUNDAI MOTOR COMPANY, Seoul (KR); KIA CORPORATION, Seoul (KR); HYUNDAI AUTOEVER CORP., Seoul (KR)

(*) Notice: Subject to any disclaimer, the term of this patent is extended or adjusted under 35 U.S.C. 154(b) by 355 days.

(21) Appl. No.: 18/070,011

(22) Filed: Nov. 28, 2022

(65) Prior Publication Data

US 2023/0322242 A1 Oct. 12, 2023

(30) Foreign Application Priority Data

Apr. 12, 2022 (KR) .................. 10-2022-0045057

(51) Int. Cl.
| | |
|---|---|
| *B60W 50/029* | (2012.01) |
| *B60W 50/02* | (2012.01) |
| *B60W 50/14* | (2020.01) |
| *B60W 60/00* | (2020.01) |
| *G06N 7/01* | (2023.01) |

(52) U.S. Cl.
CPC ...... *B60W 50/029* (2013.01); *B60W 50/0205* (2013.01); *B60W 50/14* (2013.01);
(Continued)

(58) Field of Classification Search
CPC .......... B60W 50/029; B60W 50/0205; B60W 50/14; B60W 60/0015; B60W 60/0059;
(Continued)

(56) References Cited

U.S. PATENT DOCUMENTS

| | | | | |
|---|---|---|---|---|
| 6,351,698 | B1* | 2/2002 | Kubota | G01C 21/3608 704/E15.045 |
| 2002/0103583 | A1* | 8/2002 | Ohmura | G07C 5/008 701/31.4 |
| 2002/0111756 | A1* | 8/2002 | Modgil | B60R 25/04 702/63 |
| 2005/0192727 | A1* | 9/2005 | Shostak | G07C 5/0808 701/1 |
| 2005/0273218 | A1* | 12/2005 | Breed | G06K 7/10178 701/2 |
| 2010/0011255 | A1* | 1/2010 | de Kleer | G06Q 10/04 714/47.1 |

(Continued)

*Primary Examiner* — Hunter B Lonsberry
*Assistant Examiner* — Jalal C Coduroglu
(74) *Attorney, Agent, or Firm* — Lempia Summerfield Katz LLC

(57) ABSTRACT

An autonomous driving control apparatus requests information associated with a plurality of parts of an autonomous vehicle from an external electronic device and calculates a fault rate for each of the plurality of parts using the information associated with the plurality of parts. The apparatus identifies that a first fault rate corresponding to a first part among the calculated fault rates is greater than or equal to a specified first value and calculates a first failure rate at which the first part causes a failure of the autonomous vehicle using the first fault rate. The apparatus stores the first fault rate and information associated with the first part in storage and stops performing a function associated with the first part or stops performing the entire autonomous driving function of the autonomous vehicle after a fault or a failure of the autonomous vehicle occurs.

18 Claims, 8 Drawing Sheets

(52) U.S. Cl.
CPC .... *B60W 60/0015* (2020.02); *B60W 60/0059* (2020.02); *G06N 7/01* (2023.01); *B60W 2050/021* (2013.01); *B60W 2050/0295* (2013.01); *B60W 2050/143* (2013.01); *B60W 2050/146* (2013.01); *B60W 2556/45* (2020.02)

(58) Field of Classification Search
CPC ... B60W 2050/021; B60W 2050/0295; B60W 2050/143; B60W 2050/146; B60W 2556/45; B60W 50/04; B60W 60/0016; B60W 30/181; B60W 2520/04; G06N 7/01; G06N 20/00; B60K 35/00; B60K 35/10; B60K 35/22; B60K 35/265; B60K 35/28; G06F 11/261
See application file for complete search history.

(56) References Cited

U.S. PATENT DOCUMENTS

| | | | |
|---|---|---|---|
| 2018/0373249 A1* | 12/2018 | Choi | G01C 21/3492 |
| 2019/0113916 A1* | 4/2019 | Guo | A61B 5/6893 |
| 2019/0309721 A1* | 10/2019 | Siddiqui | F02N 11/0833 |
| 2020/0320807 A1* | 10/2020 | Gorti | B60W 60/001 |
| 2020/0361480 A1* | 11/2020 | Rodriguez Bravo | B60W 60/0015 |
| 2021/0064495 A1* | 3/2021 | Huang | G11C 16/3495 |
| 2021/0157571 A1* | 5/2021 | Ogawa | G06F 16/2379 |
| 2022/0005291 A1* | 1/2022 | Konrardy | B60W 60/0015 |
| 2023/0141749 A1* | 5/2023 | Hao | G06N 3/09 714/47.3 |
| 2023/0278591 A1* | 9/2023 | Shedge | B60W 10/18 701/23 |

\* cited by examiner

AUTONOMOUS DRIVING CONTROL APPARATUS AND METHOD THEREOF

CROSS-REFERENCE TO RELATED APPLICATION

This application claims the benefit of priority to Korean Patent Application No. 10-2022-0045057, filed in the Korean Intellectual Property Office on Apr. 12, 2022, the entire contents of which are incorporated herein by reference.

TECHNICAL FIELD

The present disclosure relates to an autonomous driving control apparatus and a method thereof. More particularly, the present disclosure relates to an autonomous driving control apparatus for adaptively calculating a fault rate and a failure rate of each of the individual parts and a method thereof.

BACKGROUND

To detect a fault and/or failure signal, an autonomous vehicle, according to an existing technology, performs an operation of monitoring specific data (e.g., voltage) in real time with respect to all parts included in the autonomous vehicle and comparing the monitored data with reference data (e.g., nominal characteristic data). In this case, there is an inconvenience in which a previously learned model (e.g., a machine learning model) or input data in a failure situation for each of the individual parts is required to improve the reliability of reference data.

In addition, there is an increase in the unit cost of an autonomous vehicle due to the previously learned model or calculation processing of the input data or due to high costs of the required data. Thus, there is a need to develop a fault and failure situation identification technology having high accuracy and efficiency using a minimum amount of data in the autonomous vehicle.

SUMMARY

The present disclosure has been made to solve the above-mentioned problems occurring in the prior art while advantages achieved by the prior art are maintained intact.

An aspect of the present disclosure provides an autonomous driving control apparatus for adaptively calculating a fault rate and/or a failure rate of each of the individual parts. Another aspect of the present disclosure provides a method thereof.

Another aspect of the present disclosure provides an autonomous driving control apparatus for receiving various pieces of information associated with an autonomous vehicle from an external electronic device (e.g., a server or a data center) and predicting a fault and failure situation based on the received pieces of information. Another aspect of the present disclosure provides a method thereof.

Another aspect of the present disclosure provides an autonomous driving control apparatus for performing an identification operation of an adaptive fault and failure situation considering a characteristic of each of the individual parts and driving information (e.g., a driving speed, a driving environment temperature, and/or a temperature in the autonomous driving control apparatus) of an autonomous vehicle. Another aspect of the present disclosure provides a method thereof.

Another aspect of the present disclosure provides an autonomous driving control apparatus for selectively providing a driver with various functions (e.g., a function of displaying a user interface including a state of an autonomous vehicle on a display and/or a function of outputting a voice associated with a failure situation through an audio output device) based on a specified criterion when the calculated fault rate is greater than or equal to a specified value. Another aspect of the present disclosure provides a method thereof.

Another aspect of the present disclosure provides an autonomous driving control apparatus for transmitting characteristic values and/or fault contents of individual parts to an external electronic device based on a time when the failure situation occurs. As a result, the external electronic device provides an autonomous vehicle with information associated with a fault and a failure, which is updated using the received data, to omit a portion of complicated calculation processing and efficiently identify a fault and failure situation. Another aspect of the present disclosure provides a method thereof.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, an autonomous driving control apparatus may include a notification device that provides information about a fault or a failure of an autonomous vehicle and a storage storing information associated with a plurality of parts of the autonomous vehicle. The autonomous driving control apparatus may further include a controller that requests the information associated with the plurality of parts from an external electronic device and calculates a fault rate for each of the plurality of parts using the information associated with the plurality of parts. The information is received from the external electronic device in response to the request. The controller further identifies that a first fault rate corresponding to a first part among the calculated fault rates is greater than or equal to a specified first value and calculates a first failure rate at which the first part causes a failure of the autonomous vehicle using the first fault rate. The controller further stores the first fault rate and information associated with the first part in the storage and stops performing a function associated with the first part or stops performing the entire autonomous driving function of the autonomous vehicle after a fault or a failure of the autonomous vehicle occurs.

In an embodiment when the autonomous vehicle is in an ignition-on state, the controller may request the information associated with the plurality of parts from the external electronic device. For example, the information associated with the plurality of parts may include a characteristic value and a prior probability value of each of the plurality of parts.

In an embodiment when the controller does not receive the information associated with the plurality of parts from the external electronic device, the controller may calculate the fault rate for each of the plurality of parts using a prior probability value before the autonomous vehicle is turned off.

In an embodiment, the prior probability value, before the autonomous vehicle is turned off, may be a value calculated using the ratio of a fault or a failure to the number of mass-produced vehicles by the external electronic device. The external electronic device obtains fault information and failure information for each part transmitted from a maintenance center to a server in a web-crawling scheme.

In an embodiment, the controller may calculate the fault rate for each of the plurality of parts using Bayesian inference. The controller may also calculate the first failure rate using the Bayesian inference, based on that the first fault rate corresponding to the first part is greater than or equal to the specified first value.

In an embodiment, the controller may display a first user interface associated with a failure of the first part or outputs a warning sound by means of the notification device, when the first fault rate is greater than the specified first value during a first specified time. The controller may also stop performing the function associated with the first part, when the first fault rate is greater than a specified second value and the specified second value is greater than the specified first value during a second specified time that is longer than the first specified time.

In an embodiment, the controller may stop performing the entire autonomous driving function of the autonomous vehicle when the stopped function associated with the first part corresponds to a function meeting a specified condition.

In an embodiment, the controller may output information about a state of the autonomous vehicle as a voice using the notification device when the performance of the entire autonomous driving function of the autonomous vehicle is stopped.

In an embodiment, the controller may identify whether it is possible for the autonomous vehicle to travel manually and may control the autonomous vehicle to be stopped when it is identified that it is impossible for the autonomous vehicle to travel manually.

In an embodiment, the controller may store the first fault rate and the information associated with the first part in a temporary buffer of the storage. The controller may also store the first fault rate, the first failure rate, and the information associated with the first part in an embedded multimedia card (EMMC) of the storage when the fault or the failure of the autonomous vehicle occurs.

According to another aspect of the present disclosure, an autonomous driving control method may include requesting, by a controller, information associated with a plurality of parts of an autonomous vehicle from an external electronic device. The method may also include calculating, by the controller, a fault rate for each of the plurality of parts using the information associated with the plurality of parts. The information is received from the external electronic device in response to the request. The method may further include identifying, by the controller, that a first fault rate corresponding to a first part among the calculated fault rates is greater than or equal to a specified first value. The method may also include calculating, by the controller, a first failure rate at which the first part causes a failure of the autonomous vehicle using the first fault rate. The may further include storing, by the controller, the first fault rate and information associated with the first part. The method may also include stopping, by the controller, performance of a function associated with the first part or stopping performance of the entire autonomous driving function of the autonomous vehicle after a fault or a failure of the autonomous vehicle occurs.

In an embodiment, the requesting of the information associated with the plurality of parts of the autonomous vehicle from the external electronic device, by the controller, may include requesting the information associated with the plurality of parts from the external electronic device when the autonomous vehicle is in an ignition-on state.

In an embodiment, the calculating of the fault rate for each of the plurality of parts by the controller may include calculating the fault rate for each of the plurality of parts using a prior probability value before the autonomous vehicle is turned off when not receiving the information associated with the plurality of parts from the external electronic device.

In an embodiment, the calculating of the fault rate for each of the plurality of parts by the controller may include calculating the fault rate for each of the plurality of parts using Bayesian inference. The calculating of the first failure rate at which the first part causes the failure of the autonomous vehicle, by the controller, may include calculating the first failure rate using the Bayesian inference, based on that the first fault rate corresponding to the first part is greater than or equal to the specified first value.

In an embodiment, the autonomous driving control method may further include displaying, by the controller, a first user interface associated with a failure of the first part or outputting a warning sound using the notification device when the first fault rate is greater than the specified first value during a first specified time. The method may also include stopping, by the controller, performance of the function associated with the first part when the first fault rate is greater than a specified second value and the second value is greater than the specified first value during a second specified time that is longer than the first specified time.

In an embodiment, the stopping of the performance of the function associated with the first part, by the controller, may include stopping performance of the entire autonomous driving function of the autonomous vehicle when the stopped function associated with the first part corresponds to a function meeting a specified condition.

In an embodiment, the stopping of the performance of the entire autonomous driving function of the autonomous vehicle, by the controller, may include outputting information about a state of the autonomous vehicle as a voice using the notification device, when the performance of the entire autonomous driving function of the autonomous vehicle is stopped.

In an embodiment, the stopping of the performance of the entire autonomous driving function of the autonomous vehicle may further include identifying whether it is possible for the autonomous vehicle to travel manually and include controlling the autonomous vehicle to be stopped when it is identified that it is impossible for the autonomous vehicle to travel manually.

In an embodiment, the storing of the first fault rate and the information associated with the first part by the controller may include temporarily storing, by the controller, the first fault rate and the information associated with the first part in a temporary buffer of storage. The autonomous driving control method may further include storing, by the controller, the first fault rate, the first failure rate, and the information associated with the first part in an embedded multimedia card (EMMC) of the storage, when the fault or the failure of the autonomous vehicle occurs.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
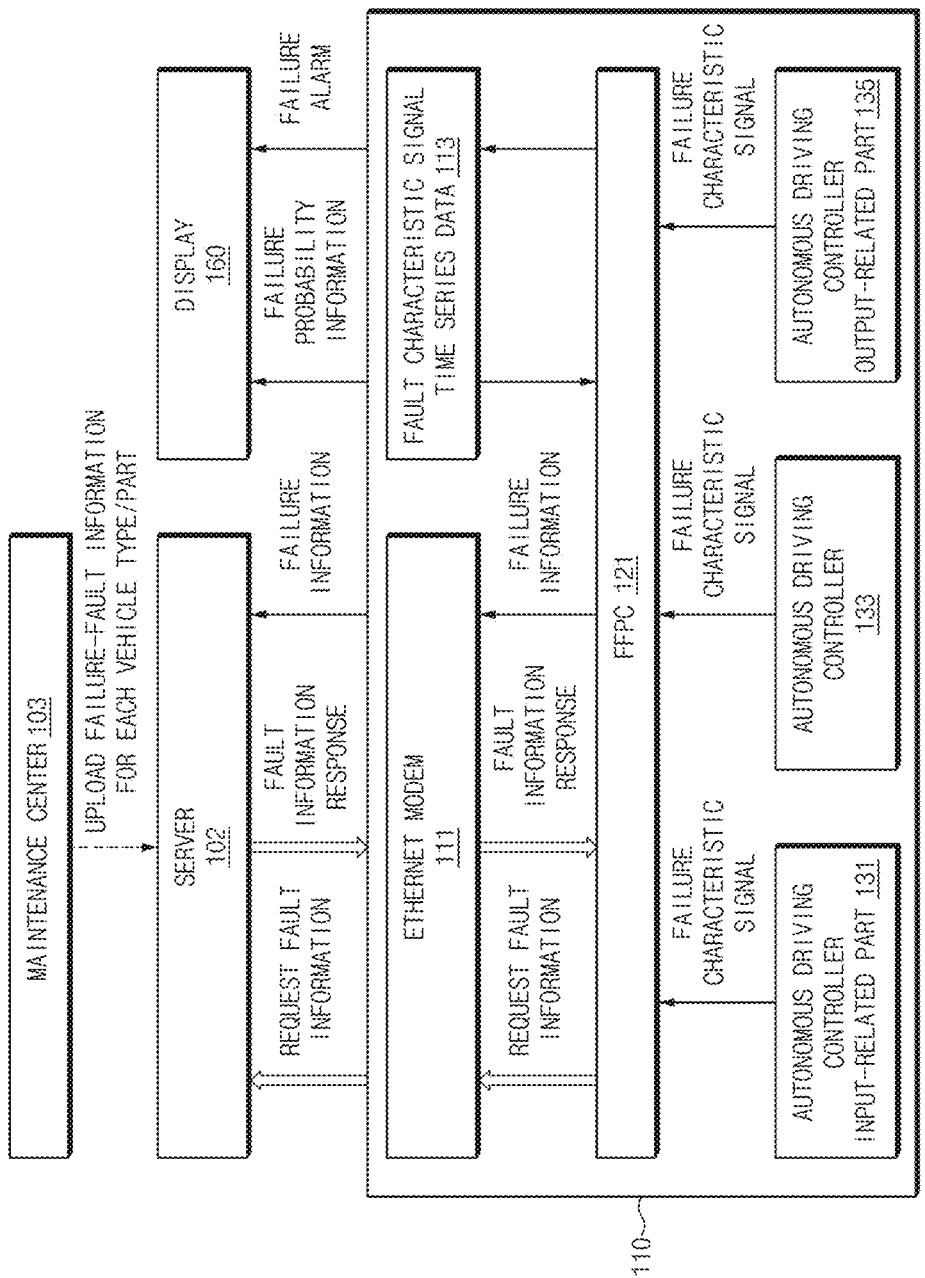
FIG. 1 is a drawing illustrating a detailed configuration and operation of an autonomous driving control apparatus according to an embodiment of the present disclosure.

Hereinafter, some embodiments of the present disclosure are described in detail with reference to the drawings. In the drawings, the same reference numerals are used throughout to designate the same or equivalent elements. In addition, a detailed description of well-known features or functions have been omitted in order not to unnecessarily obscure the gist of the present disclosure.

In describing the components of the embodiments according to the present disclosure, terms such as first, second, "A", "B", (a), (b), and the like may be used. These terms are only used to distinguish one element from another element, but do not limit the corresponding elements irrespective of the order or priority of the corresponding elements. Furthermore, unless otherwise defined, all terms including technical and scientific terms used herein are to be interpreted as is customary in the art to which the present disclosure belongs. Such terms as those defined in a generally used dictionary are to be interpreted as having meanings equal to the contextual meanings in the relevant field of art. Such terms are not to be interpreted as having ideal or excessively formal meanings unless clearly defined as having such in the present application. When a component, device, element, or the like of the present disclosure is described as having a purpose or performing an operation, function, or the like, the component, device, or element should be considered herein as being "configured to" meet that purpose or to perform that operation or function.

Hereinafter, embodiments of the present disclosure are described in detail with reference to FIGS. 1-8. Furthermore, in a description of FIGS. 1-8, an operation described as being performed by an autonomous driving control apparatus may be understood as being performed or controlled by a controller included in the autonomous driving control apparatus.

FIG. 1 is a drawing illustrating a detailed configuration and operation of an autonomous driving control apparatus 110 according to an embodiment of the present disclosure.

Referring to FIG. 1, the autonomous driving control apparatus 110 may include: an Ethernet modem 111; fault characteristic signal time series data 113; a fault/failure prediction controller (FFPC) 121; an autonomous driving controller input-related part 131; an autonomous driving controller 133; and an autonomous driving controller output-related part 135.

At least some of the components of the autonomous driving control apparatus 110 shown in FIG. 1 may be implemented by means of a controller and respective components may be implemented in the form of software or hardware. Pieces of data obtained by means of components and/or pieces of data transmitted and received between the components may be stored in a storage (not shown) of the autonomous driving control apparatus 110.

The components of the autonomous driving control apparatus 110, which are illustrated in FIG. 1, are illustrative, and the embodiments of the present disclosure are not limited thereto. For example, a display 160 may be a component included in the autonomous driving control apparatus 110. As an example, the display 160 may be defined more generally as a notification device. The notification device may display various user interfaces on the display 160. For example, the notification device may further include a voice output device (e.g., a buzzer). The notification device may output various voices through the voice output device.

In an embodiment, the autonomous driving control apparatus 110 may transmit and receive data with an external electronic device.

For example, the external electronic device may include a server 102. The server 102 may store failure/fault information for each vehicle type/part uploaded from a maintenance center 103. As an example, the server 102 may store a fault history for each vehicle type/part and may update a failure probability of an autonomous driving function according to a fault based on a specified period.

For example, the autonomous driving control apparatus 110 may request fault information from the server 102 (or a data center) and may receive the fault information from the server 102 in response to the request. As an example, when an autonomous vehicle is in a specified state (e.g., when the autonomous vehicle is in an ignition-on state and/or when the autonomous vehicle switches from an ignition-off state to the ignition-on state), the autonomous driving control apparatus 110 may request fault information from the server 102. As an example, the fault information may include information associated with a plurality of parts included in the autonomous vehicle.

For example, the autonomous driving control apparatus 110 may transmit failure information to the server 102. As an example, the failure information may include information (e.g., a fault rate or a fault probability, a failure rate or a failure probability, and/or a characteristic value) about a part, the fault of which occurs, among the plurality of parts included in the autonomous vehicle.

The Ethernet modem 111 may perform a wireless communication function between the autonomous driving control apparatus 110 and the server 102. For example, the autonomous driving control apparatus 110 may communicate with the server 102 in a carrier sense multiple access with collision detection (CSMA/CD) scheme.

The fault characteristic signal time series data 113 may be referred to as time series data generated from the FFPC 121. For example, the autonomous driving control apparatus 110 may store the fault characteristic signal time series data 113 in the storage and may transmit at least some of the stored pieces of data to the display 160.

As an example, the autonomous driving control apparatus 110 may transmit data during a specified duration immediately before a part fails among the fault characteristic signal time series data 113 to the display 160. For another example, the autonomous driving control apparatus 110 may transmit driving information of the autonomous vehicle during a specified duration immediately before a failure occurs among the fault characteristic signal time series data 113 to the display 160. The data transmitted to the display 160 may include failure alarm information and/or failure probability information.

The FFPC 121 may request information from the server 102 and may receive the information transmitted in response to the request, thus determining whether faults or failures of the plurality of parts included in the autonomous vehicle occur using the received information.

For example, the FFPC 121 may receive failure characteristic signal(s) from the autonomous driving controller input-related part 131, the autonomous driving controller 133, and/or the autonomous driving controller output-related part 135. The FFPC 121 may also determine whether the fault or failure of the part occurs based on the received failure characteristic signal(s). The FFPC 121 may use the fault information received from the server 102 when determining whether the fault or failure of the autonomous driving controller input-related part 131 occurs.

For example, when an abnormality in an input signal by an end to end (E2E) function is discovered in the signal received from the autonomous driving controller input-related part 131, the FFPC 121 may identify that the fault or failure occurs in the input-related part, the abnormality of which is discovered. The FFPC 121 may use the fault information received from the server 102 when determining whether the fault or failure of the autonomous driving controller 133 occurs.

For example, when the signal received from the autonomous driving controller 133 deviates from a specified reference range, the FFPC 121 may identify that the fault or the failure occurs in the autonomous driving controller 133. The FFPC 121 may use the fault information received from the server 102 when determining whether the fault or failure of the autonomous driving controller output-related part 135 occurs.

For example, when the signal received from the autonomous driving controller output-related part 135 deviates from the specified reference range, the FFPC 121 may identify that the fault or the failure occurs in the output-related part, the abnormality of which is discovered.

For example, the FFPC 121 may transmit the determined result to the server 102 through the Ethernet modem 111.

Figure 2:
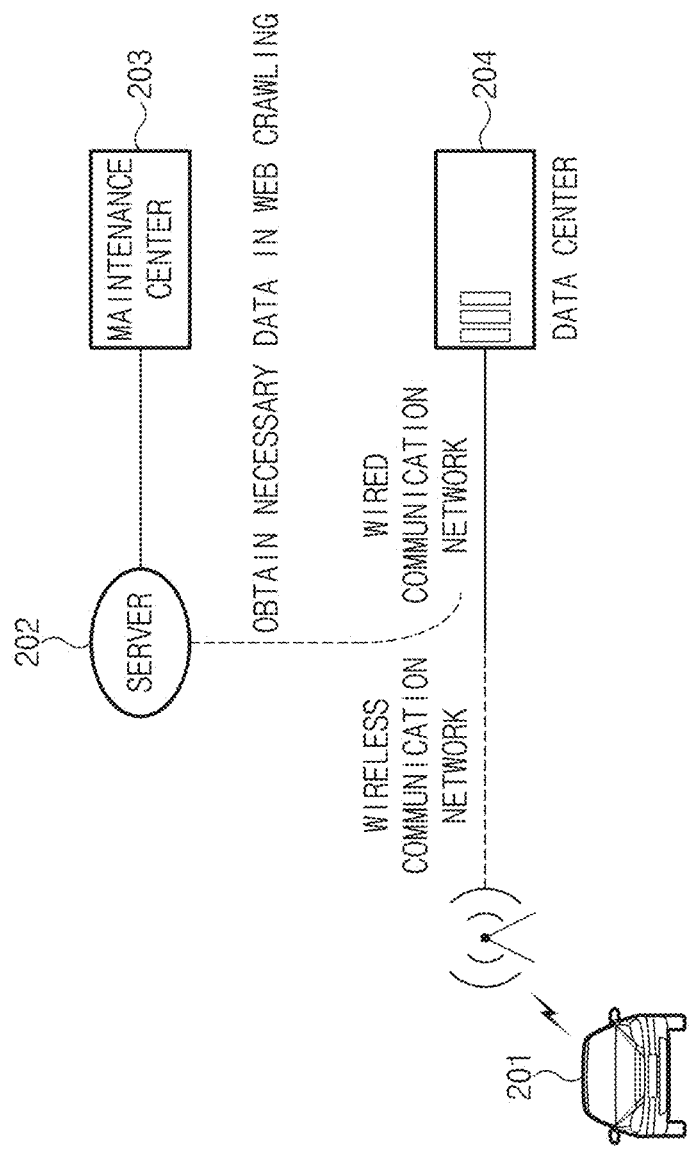
FIG. 2 is a conceptual diagram illustrating an autonomous driving control method according to an embodiment of the present disclosure.

FIG. 2 is a conceptual diagram illustrating an autonomous driving control method according to an embodiment of the present disclosure.

In the description of FIG. 2, an operation described as being performed by an autonomous driving control apparatus may be understood as being controlled by a controller of an autonomous driving control apparatus 110 of FIG. 1.

In an embodiment, an autonomous vehicle 201 may communicate with a data center 204 over a wireless communication network.

For example, the autonomous vehicle 201 may communicate with the data center 204 through an Ethernet modem (e.g., an Ethernet modem 111 of FIG. 1) to transmit and receive various pieces of data, based on the control of an autonomous driving control apparatus.

In an embodiment, the data center 204 may communicate with a server 202 over a wired communication network, but this is illustrative. Embodiments of the present disclosure are not limited thereto.

For example, the data center 204 may obtain necessary data from the server 202 based on a web crawling scheme. As an example, the necessary data may include pieces of data (e.g., vehicle information, part information, and/or fault information) associated with the autonomous vehicle 201.

In an embodiment, the server 202 may communicate with a maintenance center 203 over the wireless communication network.

For example, the server 202 may receive pieces of data associated with the autonomous vehicle 201 from the maintenance center 203. In another example, the server 202 may receive pieces of data associated with a plurality of other vehicles of different vehicle types from the autonomous vehicle 201 from the maintenance center 203. The server 202 may store the pieces of data received from the maintenance center 203.

Figure 3:
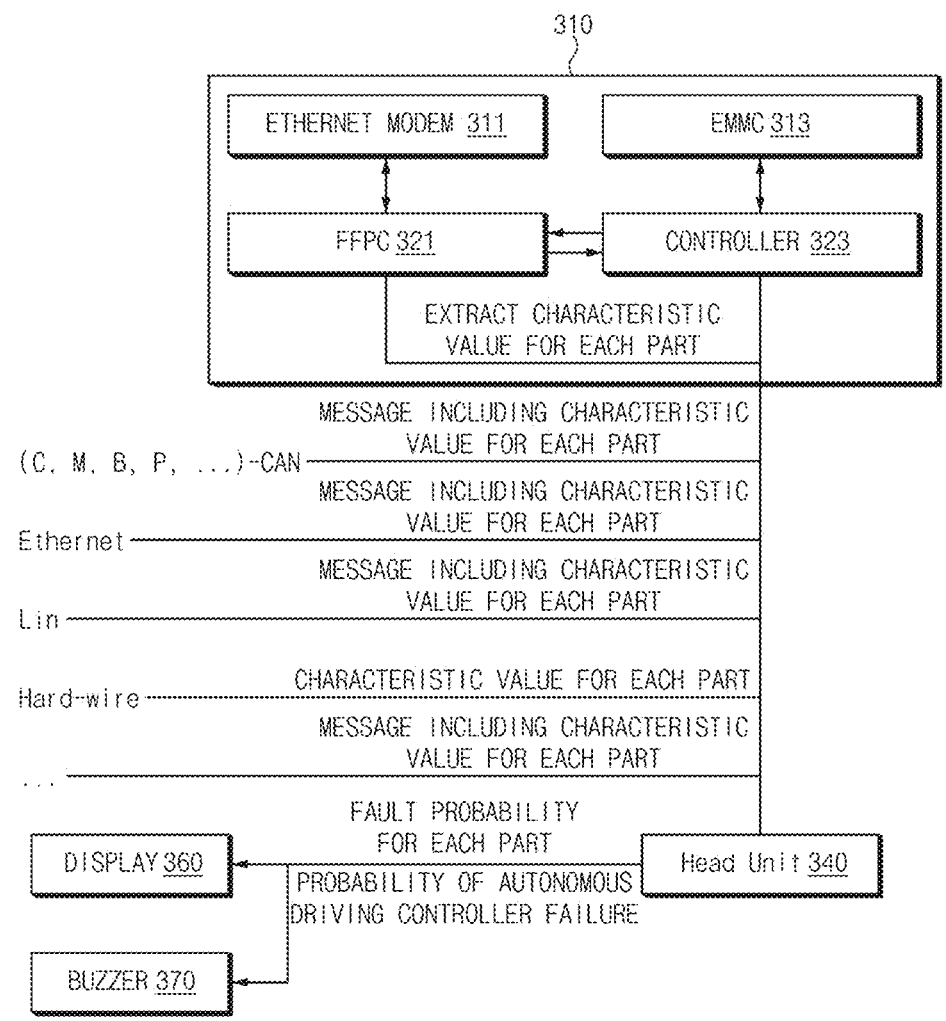
FIG. 3 is a drawing illustrating an operation of an autonomous driving control apparatus according to an embodiment of the present disclosure.

FIG. 3 is a drawing illustrating an operation of an autonomous driving control apparatus 310 according to an embodiment of the present disclosure.

Referring to FIG. 3, according to an embodiment, the autonomous driving control apparatus 310 (e.g., an autonomous driving control apparatus 110 of FIG. 1) may include: an Ethernet modem 311 (e.g., an Ethernet modem 111 of FIG. 1); an embedded multimedia card (EMMC) 313; a fault/failure prediction controller (FFPC) 321 (e.g., an FFPC 121 of FIG. 1); and a controller 323. The components of the autonomous driving control apparatus 310, which are illustrated in FIG. 3, are illustrative, and embodiments of the present disclosure are not limited thereto. For example, a display 360 and a buzzer 370 may be components included in the autonomous driving control apparatus 310. As an example, the display 360 and the buzzer 370 may be defined as a notification device. The notification device may display various user interfaces using the display 360 and may output various voices using the buzzer 370.

When it is identified that an autonomous vehicle switches from an ignition-off state to an ignition-on state, the FFPC 321 may request information associated with a plurality of parts from a server (e.g., a server 102 of FIG. 1) through the Ethernet modem 311.

The FFPC 321 may receive the information associated with the plurality of parts through the Ethernet modem 311 from the server. For example, the received information may include part information, failure details, a cause of failure, a failure history, a characteristic value of each of parts immediately before a failure, or a combination thereof, which is updated and stored through a maintenance center (e.g., a maintenance center 103 of FIG. 1) by the server.

The FFPC 321 may calculate a fault rate for each of the plurality of parts using the received information. For example, the FFPC 321 may transmit the calculated fault rate to the controller 323.

The controller 323 may store a characteristic value of a part, corresponding to at least some of the received fault rates, in a temporary buffer. For example, the controller 323 may store a characteristic value corresponding to a part having a fault rate of a specified value or more among the received fault rates in the temporary buffer during a specified period.

The controller 323 may store a characteristic value corresponding to at least one of the plurality of parts in the EMMC 313. For example, the controller 323 may store a characteristic value corresponding to a part, and a fault or a failure that actually occurs in the EMMC 313.

When it is determined that the fault or the failure actually occurs, the controller 323 may stop performing a function of the autonomous driving control apparatus 310 and may transmit a characteristic value for each part or a message including the characteristic value for each part. The characteristic value or message is stored in the EMMC 313 to an external electronic device (e.g., a server or a data center).

As an example, the controller 323 may transmit the characteristic value to the external electronic device based on a controller area network (CAN), an Ethernet, a local interconnect network (LIN), and/or a hard-wire.

The FFPC 321 may transmit the calculated fault rate to a head unit 340.

The head unit 340 may identify a part corresponding to the received fault rate. For example, the head unit 340 may identify the part corresponding to the fault rate and may identify that the part is in a fault or failure state when the fault rate is maintained over a specified value during a specified time or more.

The head unit 340 may transmit a failure probability for each part and a probability of an autonomous driving controller failure to the display 360 and/or the buzzer 370.

The display 360 may display a user interface associated with information about a part, and the fault or the failure that occurs, based on the received data.

The buzzer 370 may provide (or output) a warning sound when there is a part, the fault or the failure of which occurs, based on the received data.

Figure 4:
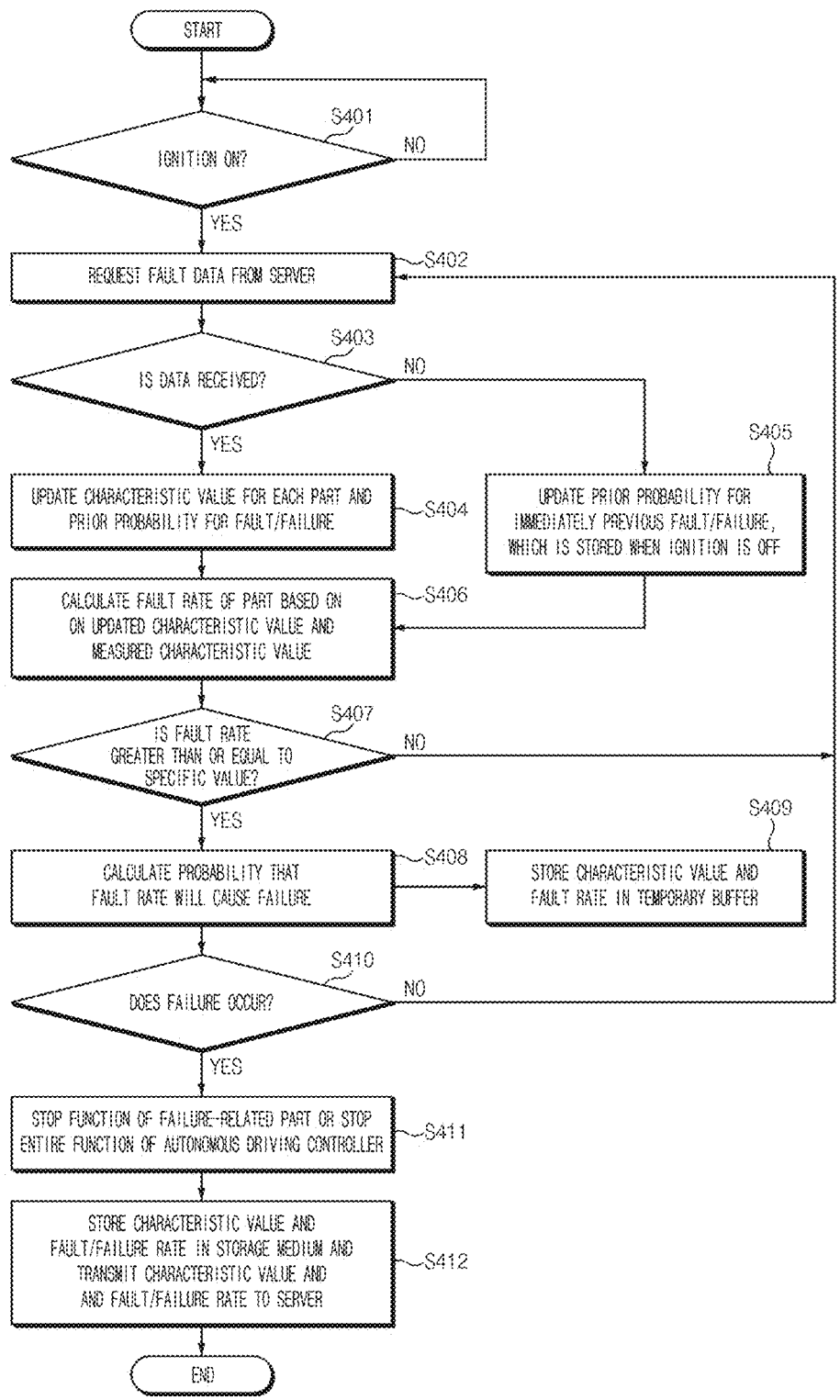
FIG. 4 is an operational flowchart of an autonomous driving control apparatus according to an embodiment of the present disclosure.

FIG. 4 is an operational flowchart of an autonomous driving control apparatus according to an embodiment of the present disclosure.

FIG. 4 is a flowchart for describing an autonomous driving control method according to an embodiment of the present disclosure. Hereinafter, it is assumed that an autonomous driving control apparatus 110 having components of FIG. 1 performs a process of FIG. 4. Furthermore, in a description of FIG. 4, an operation described as being performed by an autonomous driving control apparatus may be understood as being controlled by a controller of an autonomous driving control apparatus 110 of FIG. 1.

Referring to FIG. 4, in S401, the autonomous driving control apparatus may identify whether an autonomous vehicle is in an ignition-on state. For example, the autonomous driving control apparatus may identify whether the autonomous vehicle switches from an ignition-off state to the ignition-on state.

As an example, when it is identified that the autonomous vehicle is in the ignition-off state, the autonomous driving control apparatus may repeatedly perform S401.

As an example, when it is identified that the autonomous vehicle switches to the ignition-on state, the autonomous driving control apparatus may perform S402.

As an example, in S402, the autonomous driving control apparatus may request fault data (or fault information) from a server (e.g., a server 102 of FIG. 1).

As an example, the fault information may include information (e.g., a characteristic value for each part) associated with a plurality of parts included in the autonomous vehicle.

In S403, the autonomous driving control apparatus may identify whether data is received from the server.

As an example, when it is identified that the data is received, the autonomous driving control apparatus may perform S404.

As an example, when it is identified that the data is not received, the autonomous driving control apparatus may perform S405.

When not receiving the data from the server, in S405, the autonomous driving control apparatus may update a prior probability for an immediately previous fault/failure, which is stored when the ignition is off.

As an example, the autonomous driving control apparatus may identify a prior probability value associated with a fault rate and/or a failure rate for each of a plurality of parts, which is stored immediately before the autonomous vehicle is turned off.

When it is identified that the data is received from the server, in S404, the autonomous driving control apparatus may update a characteristic value for each part and a prior probability for a fault/failure using the received data.

As an example, the prior probability may be a value calculated using the ratio of the fault or the failure to the number of mass-produced vehicles by the external electronic device, as the external electronic device obtains fault information and failure information for each part in a web-crawling scheme.

In S406, the autonomous driving control apparatus may calculate a fault rate of a part based on the updated characteristic value and the measured characteristic value.

As an example, the autonomous driving control apparatus may compare the updated characteristic value with characteristic values of parts, which are measured in real-time. The autonomous driving control apparatus may also calculate the fault rate of the part using the compared result.

As an example, the autonomous driving control apparatus may calculate a fault rate for each of the plurality of parts, using Bayesian inference.

In S407, the autonomous driving control apparatus may identify whether at least one of the calculated fault rates is greater than or equal to a specific value.

As an example, when it is identified that a first fault rate corresponding to a first part among the calculated fault rates is greater than or equal to a specified first value, the autonomous driving control apparatus may perform S408.

As an example, when it is identified that the first fault rate corresponding to the first part among the calculated fault rates is less than the specified first value, the autonomous driving control apparatus may perform S402.

In S408, the autonomous driving control apparatus may calculate a probability in which a fault rate of the specific value or more will cause a failure.

As an example, the autonomous driving control apparatus may calculate a probability that a fault or failure of the first part will occur. The probability is based on the first fault rate corresponding to the first part among the calculated fault rates that are greater than or equal to the specified first value.

As an example, the autonomous driving control apparatus may calculate a first failure rate using the Bayesian inference, based on that the first fault rate is greater than or equal to the specified first value.

In S409, the autonomous driving control apparatus may store the characteristic value and the fault rate in a temporary buffer.

As an example, the autonomous driving control apparatus may store the first fault rate corresponding to the first part and a characteristic value of the first part in the temporary buffer.

As an example, in S410, the autonomous driving control apparatus may identify whether a failure occurs in the autonomous driving control apparatus.

As an example, when it is identified that the failure occurs, the autonomous driving control apparatus may perform S411.

As an example, when it is identified that the failure does not occur, the autonomous driving control apparatus may perform S402.

In S411, the autonomous driving control apparatus may stop a function of a failure-related part or may stop the entire function of an autonomous driving controller.

As an example, when the first fault rate is greater than the specified first value during the first specified time, the autonomous driving control apparatus may display a first user interface associated with the failure of the first part on a display device included in the autonomous vehicle. The autonomous driving control apparatus may also provide (or output) a warning sound using an audio output device included in the autonomous vehicle.

As an example, when the first fault rate is greater than a specified second value that is greater than the specified first value during a second specified time that is longer than the first specified time, the autonomous driving control apparatus may stop performing the function associated with the first part.

As an example, when the function associated with the first part, the performance of the function of which is stopped, corresponds to a function meeting a specified condition, the autonomous driving control apparatus may stop performing the entire autonomous driving function of the autonomous vehicle. The specified condition may be whether there is a core operation of the autonomous driving function.

As an example, when the performance of the entire autonomous driving function of the autonomous vehicle is stopped, the autonomous driving control apparatus may output information about a state of the autonomous vehicle as a voice using the audio output device.

As an example, when the performance of the entire autonomous driving function of the autonomous vehicle is stopped, the autonomous driving control apparatus may identify whether it is possible for the autonomous vehicle to travel manually. When it is identified that it is impossible (e.g., not possible) for the autonomous vehicle to travel manually, the autonomous driving control apparatus may control the autonomous vehicle to be stopped.

In S412, the autonomous driving control apparatus may store the characteristic value and the fault/failure rate in a storage medium and may transmit the characteristic value and the fault/failure rate to the server.

As an example, the autonomous driving control apparatus may store the characteristic value, the first fault rate, and the first failure rate corresponding to the first part in an EMMC (e.g., an EMMC 313 of FIG. 3) included in its storage. The autonomous driving control apparatus may transmit the characteristic value, the first fault rate, and the first failure value corresponding to the first part to the server.

In an embodiment, sensitivity and specificity may be used in the process where the autonomous driving control apparatus calculates the fault rate and the failure rate. The scheme where the autonomous driving control apparatus calculates the sensitivity and the specificity may be referred to by Table 1 below and Equation 1 below.

TABLE 1

| Diagnosis result (for each vehicle type) | Fault for each part | Autonomous driving controller failure | Normal |
|---|---|---|---|
| Fault/failure True | A (true positive) | B (true positive) | C (false positive) |
| Fault/failure True | D (false positive) | E (false negative) | F (false negative) |

$$\text{Sensitivity for fault} = \frac{A}{A+D} \quad \text{[Equation 1]}$$
$$\text{Sensitivity for failure} = B(B+E)$$
$$\text{Specificity for fault or failure} = \frac{F}{C+F}$$

In an embodiment, a posterior probability calculated based on Bayesian inference may be referred to by Equation 2 below.

$$P(H|E) = P(E|H) * \frac{P(H)}{P(E)} \quad \text{[Equation 2]}$$
$$P(E|H) = \text{Sensitivity} * \frac{P(H)}{P(E)}$$
$$P(H) = \text{Prior probability}$$
$$P(E) = \text{Sensitivity} * \text{Prior probability} +$$
$$(100\% - \text{Specificity}) * (100\% - \text{Prior probability})$$

Figure 5:
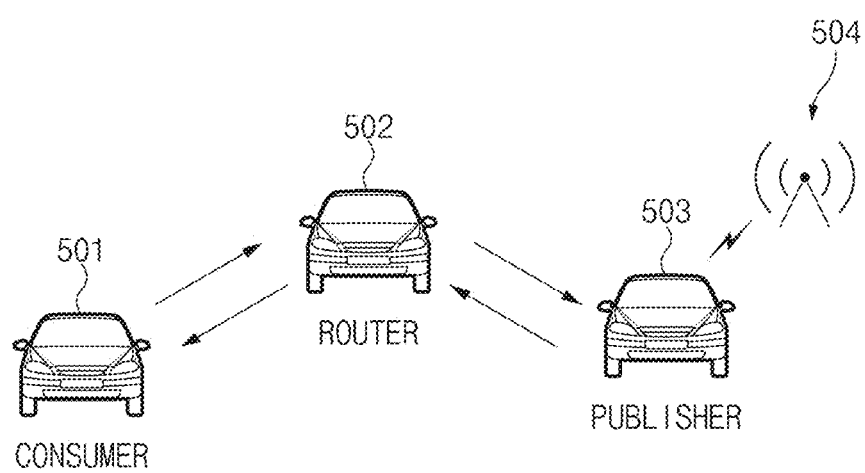
FIG. 5 is a conceptual diagram illustrating an autonomous driving control method according to an embodiment of the present disclosure.

FIG. 5 is a conceptual diagram illustrating an autonomous driving control method according to an embodiment of the present disclosure.

In FIG. 5, a consumer 501 may be defined as the autonomous vehicle described above with reference to FIGS. 1-4. Thus, a router 502 and a publisher 503 may be defined as other vehicles which travel outside the autonomous vehicle.

According to FIG. 5, the autonomous vehicle (e.g., the consumer 501) may transmit and receive data with an external vehicle and/or an external infrastructure based on a vehicle-to-vehicle (V2V) communication scheme and/or a vehicle to infrastructure (V2I) communication scheme.

In an embodiment, the consumer 501 may transmit and receive data with the router 502, the publisher 503, and/or a base station 504 based on a wireless network (e.g., a long-term evolution (LTE) or 5G network) based on IP address-based communication.

For example, the consumer 501 may collect prior probability information and/or a part characteristic value from the outside.

For example, the consumer 501 may transmit prior probability information and/or a part characteristic value to the outside under an environment in which a cloud network is established.

In an embodiment, the consumer 501 may calculate a posterior probability using the pieces of data received from the outside.

Figure 6:
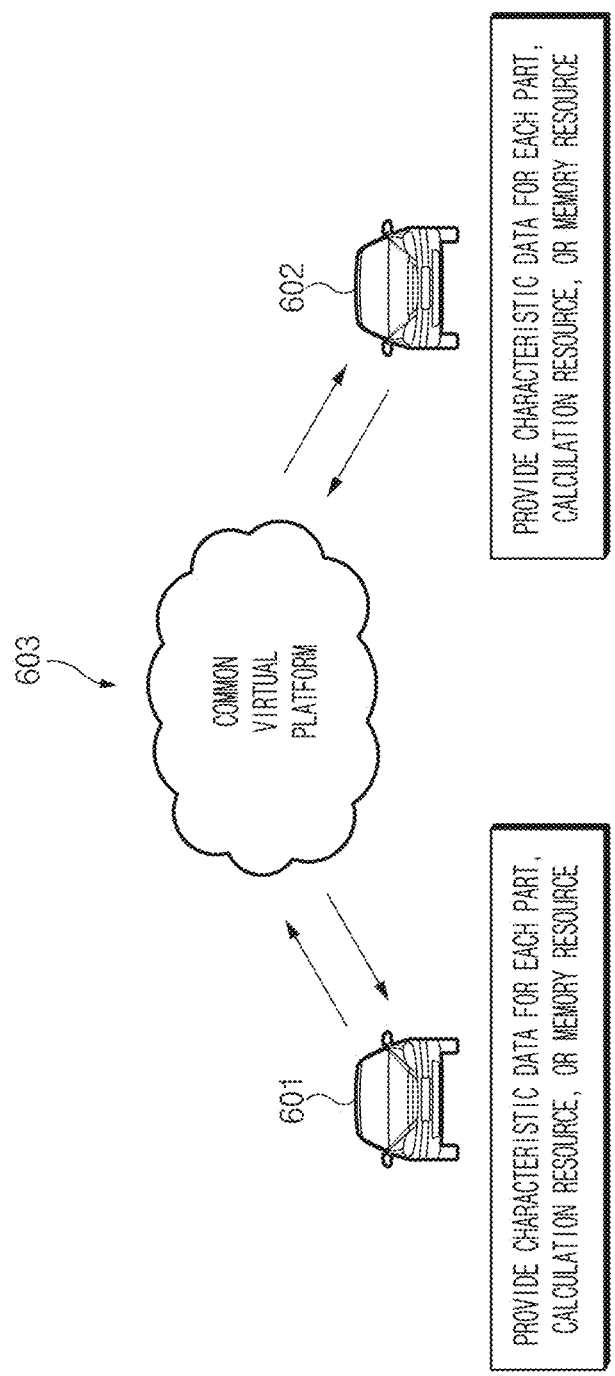
FIG. 6 is a conceptual diagram illustrating an autonomous driving control method according to an embodiment of the present disclosure.

FIG. 6 is a conceptual diagram illustrating an autonomous driving control method according to an embodiment of the present disclosure.

In FIG. 6, a first vehicle 601 may be defined as an autonomous vehicle described above with reference to FIGS. 1-4 or a consumer 501 described above with reference to FIG. 5. Thus, a second vehicle 602 may be defined as another vehicle (e.g., a router 502 or a publisher 503) that travels outside the first vehicle 601.

According to FIG. 6, the first vehicle 601 may transmit and receive data with an external vehicle and/or an external infrastructure based on a V2V communication scheme and/or a V2I communication scheme.

In an embodiment, the first vehicle 601 may receive characteristic data for each part, a calculation resource, or a memory resource transmitted by the second vehicle 602, under a cloud network established around a common virtual platform 603.

In an embodiment, the first vehicle 601 may provide the second vehicle (e.g., another vehicle) 602 with characteristic data for each part of the first vehicle 601, a calculation resource of the first vehicle 601, or a memory resource of the first vehicle 601.

In an embodiment, the common virtual platform 603 may calculate a posterior probability by means of machine learning-based probability calculation based on a cloud computing function. The common virtual platform 603 may provide the first vehicle 601 and/or the second vehicle 602 with the calculated posterior probability.

The communication method of the autonomous vehicle is described above using the other vehicle, the base station (not shown), and the platform in FIGS. 5 and 6, but embodiments of the present disclosure are not limited thereto. For example, the autonomous vehicle may communicate with a road-side unit (RSU).

Figure 7:
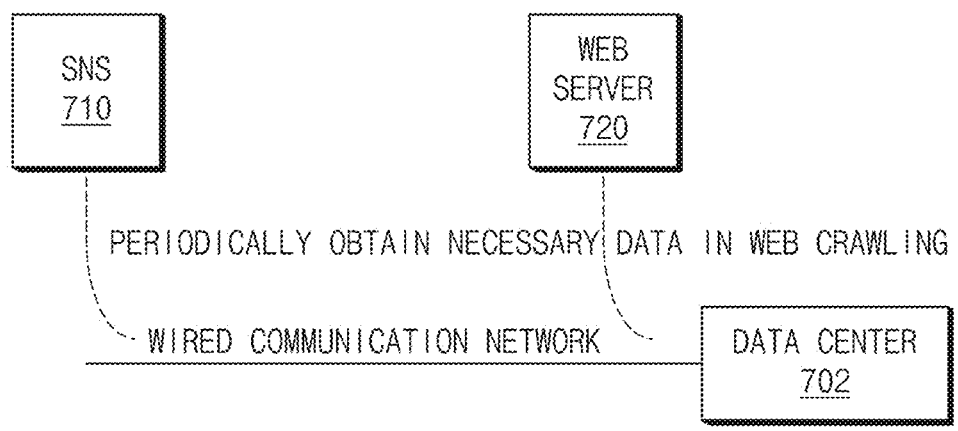
FIG. 7 is a conceptual diagram illustrating an autonomous driving control method according to an embodiment of the present disclosure.

FIG. 7 is a conceptual diagram illustrating an autonomous driving control method according to an embodiment of the present disclosure.

Referring to FIG. 7, according to an embodiment, a data center 702 may communicate with a social networking service (SNS) 710 and/or a web server 720 based on a wired communication network.

In an embodiment, the data center 702 may obtain necessary data based on a web crawling scheme from the SNS 710 and/or the web server 720 based on a specified period.

For example, the data center 702 may analyze a search term ranking for each vehicle type based on the specified period, may identify part information occupying a high proportion in conjunction with fault information, and may assign a weight to a characteristic value and a prior probability value of the identified part. Thus, the processed result is broadcast to the same vehicle type.

For example, receiving broadcasting data, the other vehicle may update a prior probability based on the received data and may calculate a posterior probability based on the updated data.

Figure 8:
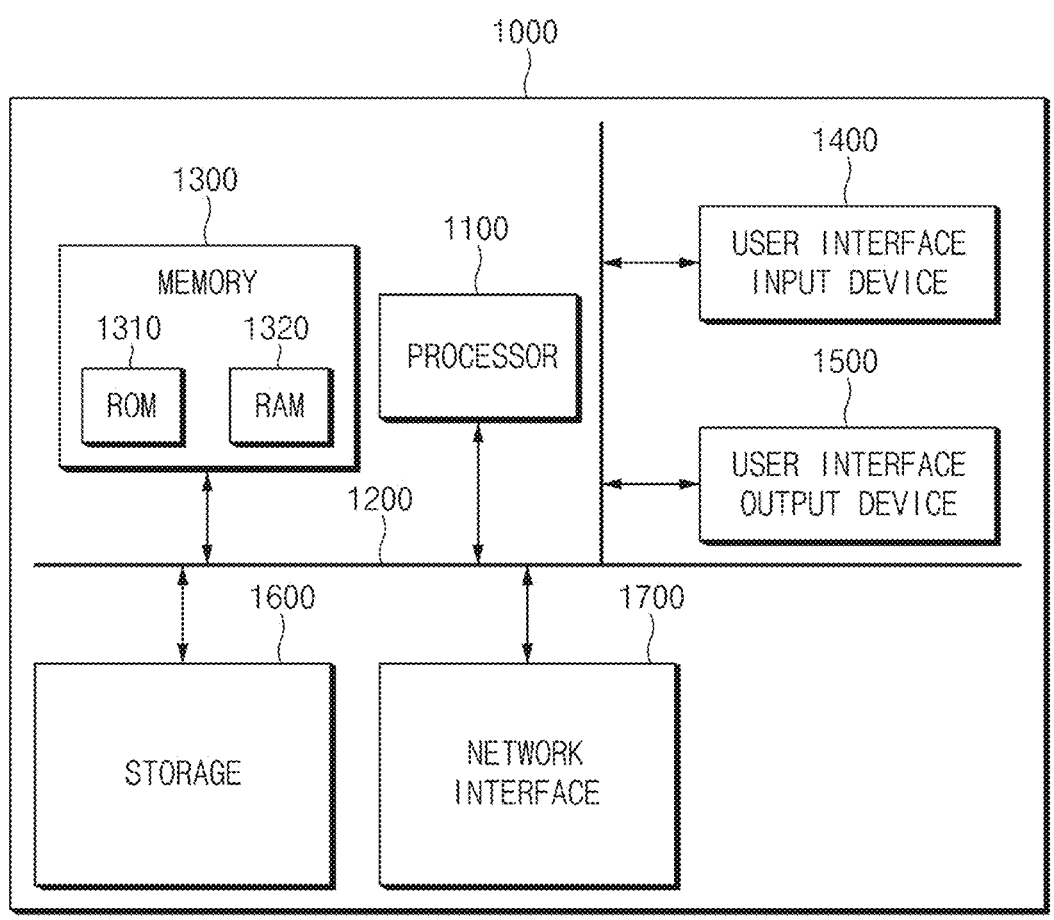
FIG. 8 is a block diagram illustrating a computing system according to an embodiment of the present disclosure.

FIG. 8 is a block diagram illustrating a computing system according to an embodiment of the present disclosure.

Referring to FIG. 8, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read Only Memory (ROM) 1310, a Random Access Memory (RAM) 1320, and the like.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a RAM, a flash memory, a ROM, an erasable programmable ROM (EPROM), an electrical EPROM (EEPROM), a register, a hard disk, a removable disk, a compact disc-ROM (CD-ROM), and the like.

The storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

A description is given of effects of the autonomous driving control apparatus and the method thereof according to an embodiment of the present disclosure.

According to at least one of the embodiments of the present disclosure, the autonomous driving control apparatus and the method thereof may be provided to adaptively identify a fault and/or failure situation of an autonomous vehicle.

Furthermore, according to at least one of the embodiments of the present disclosure, the autonomous driving control apparatus and the method thereof may be provided to efficiently perform autonomous driving control to prevent an unexpected accident.

In addition, various effects ascertained directly or indirectly through the present disclosure may be provided.

Hereinabove, although the present disclosure has been described with reference to embodiments and the accompanying drawings, the present disclosure is not limited thereto. Instead, the embodiments of the present disclosure may be variously modified and altered by those having ordinary skill in the art to which the present disclosure pertains without departing from the spirit and scope of the present disclosure claimed in the following claims.

Therefore, embodiments of the present disclosure are not intended to limit the technical spirit of the present disclosure but are instead provided only for illustrative purposes. The scope of the present disclosure should be construed based on the accompanying claims, and all the technical ideas within the scope equivalent to the claims should be included in the scope of the present disclosure.

What is claimed is:

1. An autonomous driving control apparatus, comprising:
a notification device configured to provide information about a fault or a failure of an autonomous vehicle;
a storage storing information associated with a plurality of parts of the autonomous vehicle; and
a controller configured to
request the information associated with the plurality of parts from an external electronic device,
calculate a fault rate for each of the plurality of parts, using the information associated with the plurality of parts, the information being received from the external electronic device in response to the request,
identify that a first fault rate corresponding to a first part among the calculated fault rates is greater than or equal to a specified first value,
calculate a first failure rate at which the first part causes a failure of the autonomous vehicle using the first fault rate,
store the first fault rate and information associated with the first part in the storage, and
stop performing a function associated with the first part or stop performing an entire autonomous driving function of the autonomous vehicle, after a fault or a failure of the autonomous vehicle occurs,
wherein the controller displays a first user interface associated with a failure of the first part or outputs a warning sound by means of the notification device, when the first fault rate is greater than the specified first value during a first specified time, and wherein the controller stops performing the function associated with the first part, when the first fault rate is greater than a specified second value and the specified second value is greater than the specified first value during a second specified time that is longer than the first specified time.

2. The autonomous driving control apparatus of claim 1, wherein the controller requests the information associated with the plurality of parts from the external electronic device, when the autonomous vehicle is in an ignition-on state, and wherein the information associated with the plurality of parts includes a characteristic value and a prior probability value of each of the plurality of parts.

3. The autonomous driving control apparatus of claim 1, wherein the controller calculates the fault rate for each of the plurality of parts using a prior probability value before the autonomous vehicle is turned off, when not receiving the information associated with the plurality of parts from the external electronic device.

4. The autonomous driving control apparatus of claim 3, wherein the prior probability value before the autonomous vehicle is turned off is a value calculated using a ratio of a fault or a failure to a number of mass-produced vehicles by the external electronic device as the external electronic device obtains fault information and failure information for each part transmitted from a maintenance center to a server in a web-crawling scheme.

5. The autonomous driving control apparatus of claim 1, wherein the controller calculates the fault rate for each of the plurality of parts using Bayesian inference, and calculates the first failure rate using the Bayesian inference, based on that the first fault rate corresponding to the first part that is greater than or equal to the specified first value.

6. The autonomous driving control apparatus of claim 1, wherein the controller stops performing the entire autonomous driving function of the autonomous vehicle, when the stopped function associated with the first part corresponds to a function meeting a specified condition.

7. The autonomous driving control apparatus of claim 6, wherein the controller outputs information about a state of the autonomous vehicle as a voice using the notification device, when the performance of the entire autonomous driving function of the autonomous vehicle is stopped.

8. The autonomous driving control apparatus of claim 7, wherein the controller identifies whether it is possible for the autonomous vehicle to travel manually and controls the autonomous vehicle to be stopped, when it is identified that it is impossible for the autonomous vehicle to travel manually.

9. The autonomous driving control apparatus of claim 1, wherein the controller stores the first fault rate and the information associated with the first part in a temporary buffer of the storage, and wherein the controller stores the first fault rate, the first failure rate, and stores the information associated with the first part in an embedded multimedia card (EMMC) of the storage, when the fault or the failure of the autonomous vehicle occurs.

10. An autonomous driving control method, comprising:
requesting, by a controller, information associated with a plurality of parts of an autonomous vehicle from an external electronic device;

calculating, by the controller, a fault rate for each of the plurality of parts, using the information associated with the plurality of parts, the information being received from the external electronic device in response to the request;

identifying, by the controller, that a first fault rate corresponding to a first part among the calculated fault rates is greater than or equal to a specified first value;

calculating, by the controller, a first failure rate at which the first part causes a failure of the autonomous vehicle, using the first fault rate;

storing, by the controller, the first fault rate and information associated with the first part;

stopping, by the controller, performance of a function associated with the first part or stopping performance of an entire autonomous driving function of the autonomous vehicle, after a fault or a failure of the autonomous vehicle occurs;

displaying, by the controller, a first user interface associated with a failure of the first part or outputting a warning sound using a notification device, when the first fault rate is greater than the specified first value during a first specified time; and stopping, by the controller, performance of the function associated with the first part, when the first fault rate is greater than a specified second value and the specified second value is greater than the specified first value during a second specified time longer than the first specified time.

11. The autonomous driving control method of claim 10, wherein the requesting of the information associated with the plurality of parts of the autonomous vehicle from the external electronic device by the controller includes requesting the information associated with the plurality of parts from the external electronic device, when the autonomous vehicle is in an ignition-on state, and wherein the information associated with the plurality of parts includes a characteristic value and a prior probability value of each of the plurality of parts.

12. The autonomous driving control method of claim 11, wherein the calculating of the fault rate for each of the plurality of parts by the controller includes calculating the fault rate for each of the plurality of parts using a prior probability value before the autonomous vehicle is turned off, when not receiving the information associated with the plurality of parts from the external electronic device.

13. The autonomous driving control method of claim 12, wherein the prior probability value before the autonomous vehicle is turned off is a value calculated using a ratio of a fault or a failure to a number of mass-produced vehicles by the external electronic device as the external electronic device obtains fault information and failure information for each part transmitted from a maintenance center to a server in a web-crawling scheme.

14. The autonomous driving control method of claim 10, wherein the calculating of the fault rate for each of the plurality of parts by the controller includes calculating the fault rate for each of the plurality of parts, using Bayesian inference, and wherein the calculating of the first failure rate at which the first part causes the failure of the autonomous vehicle by the controller includes calculating the first failure rate using the Bayesian inference, based on that the first fault rate corresponding to the first part is greater than or equal to the specified first value.

15. The autonomous driving control method of claim 10, wherein the stopping of the performance of the function associated with the first part by the controller includes:
   stopping performance of the entire autonomous driving function of the autonomous vehicle, when the stopped function associated with the first part corresponds to a function meeting a specified condition.

16. The autonomous driving control method of claim 15, wherein the stopping of the performance of the entire autonomous driving function of the autonomous vehicle by the controller includes outputting information about a state of the autonomous vehicle as a voice using the notification device, when the performance of the entire autonomous driving function of the autonomous vehicle is stopped.

17. The autonomous driving control method of claim 16, wherein the stopping of the performance of the entire autonomous driving function of the autonomous vehicle further includes:
   identifying whether it is possible for the autonomous vehicle to travel manually; and
   controlling the autonomous vehicle to be stopped, when it is identified that it is difficult for the autonomous vehicle to travel manually.

18. The autonomous driving control method of claim 10, wherein the storing of the first fault rate and the information associated with the first part by the controller includes temporarily storing, by the controller, the first fault rate and the information associated with the first part in a temporary buffer of storage, and
   further comprising storing, by the controller, the first fault rate, the first failure rate, and the information associated with the first part in an embedded multimedia card (EMMC) of the storage, when the fault or the failure of the autonomous vehicle occurs.

\* \* \* \* \*